(12) United States Patent
Conner

(10) Patent No.: US 12,297,711 B2
(45) Date of Patent: May 13, 2025

(54) CASING A WELLBORE IN MAGMA

(71) Applicant: EnhancedGEO Holdings, LLC, St. Petersburg, FL (US)

(72) Inventor: Kimberly C. Conner, Wetumpka, AL (US)

(73) Assignee: EnhancedGEO Holdings, LLC, St. Petersburg, FL (US)

( * ) Notice: Subject to any disclaimer, the term of this patent is extended or adjusted under 35 U.S.C. 154(b) by 0 days.

(21) Appl. No.: 18/141,326

(22) Filed: Apr. 28, 2023

(65) Prior Publication Data

US 2024/0360734 A1 Oct. 31, 2024

(51) Int. Cl.
| | | |
|---|---|---|
| E21B 43/10 | (2006.01) | |
| E21B 33/04 | (2006.01) | |
| E21B 36/00 | (2006.01) | |
| F24T 10/00 | (2018.01) | |

(52) U.S. Cl.
CPC ............ *E21B 33/04* (2013.01); *E21B 36/001* (2013.01); *E21B 43/10* (2013.01); *F24T 2010/53* (2018.05); *Y02E 10/10* (2013.01)

(58) Field of Classification Search
CPC ........ E21B 43/10; F24T 2010/53; F24T 10/20
See application file for complete search history.

(56) References Cited

U.S. PATENT DOCUMENTS

| | | |
|---|---|---|
| 227,908 A | 5/1880 | Magill |
| 1,853,351 A | 4/1932 | Hayes |
| 1,882,314 A | 10/1932 | Burt |
| 2,299,548 A | 10/1942 | Maier |
| 3,280,923 A | 10/1966 | Muench |
| 3,398,794 A * | 8/1968 | Fox, Jr. ................... E21B 43/10 166/381 |
| 3,498,381 A | 3/1970 | Earlougher, Jr. |
| 3,613,806 A | 10/1971 | Malott |
| 3,757,516 A | 9/1973 | Mc |
| 3,765,477 A | 10/1973 | Van |
| 3,864,208 A | 2/1975 | Van |
| 3,950,949 A | 4/1976 | Martin et al. |

(Continued)

FOREIGN PATENT DOCUMENTS

| | | |
|---|---|---|
| CN | 106837176 A | 6/2017 |
| CN | 108952650 A | 12/2018 |

(Continued)

OTHER PUBLICATIONS

Colp, John L., Final Report—Magma Energy Research Project, Sandia Report, Sand82-2377, Unlimited Release, UC-66, prepared by Sandia National Laboratories under contrace DE-AC04-76DP00789, Printed Oct. 1982, 42 pages.

(Continued)

*Primary Examiner* — Blake Michener
(74) *Attorney, Agent, or Firm* — Stephen Y. Liu; James H. Ortega; Carstens, Allen & Gourley, LLP

(57) ABSTRACT

A process for preparing a geothermal system involves preparing a borehole that extends into an underground magma reservoir, providing a flow of a first fluid into the borehole, thereby maintaining a rock layer around a portion of the borehole located within the magma reservoir, lowering a casing into the borehole, and providing a second fluid into the casing, thereby causing the casing to sink into a volume of the first fluid that is inside the borehole.

18 Claims, 9 Drawing Sheets

(56) References Cited

U.S. PATENT DOCUMENTS

| | | |
|---|---|---|
| 3,957,108 A | 5/1976 | Huisen |
| 3,967,675 A | 7/1976 | Georgii |
| 4,043,129 A | 8/1977 | McCabe et al. |
| 4,047,093 A | 9/1977 | Levoy |
| 4,054,176 A | 10/1977 | Huisen |
| 4,057,108 A | 11/1977 | Broussard |
| 4,116,285 A | 9/1978 | Guerber |
| 4,140,184 A | 2/1979 | Bechtold et al. |
| 4,171,019 A | 10/1979 | Cole |
| 4,286,651 A | 9/1981 | Steiger et al. |
| 4,492,083 A | 1/1985 | McCabe et al. |
| 4,642,987 A | 2/1987 | Csorba et al. |
| 4,665,705 A | 5/1987 | Bonham, Jr. |
| 4,776,169 A | 10/1988 | Coles, Jr. |
| 4,929,348 A | 5/1990 | Rice |
| 4,945,947 A | 8/1990 | Westra et al. |
| 5,513,573 A | 5/1996 | Sutton |
| 5,860,279 A | 1/1999 | Bronicki et al. |
| 5,911,684 A | 6/1999 | Shnell |
| 6,237,404 B1 | 5/2001 | Crary et al. |
| 6,708,494 B1 | 3/2004 | Hamann |
| 7,124,584 B1 | 10/2006 | Wetzel et al. |
| 8,047,285 B1 | 11/2011 | Smith |
| 8,201,409 B1 | 6/2012 | Zakiewicz |
| 9,181,931 B2 | 11/2015 | McBay |
| 9,298,756 B1 | 3/2016 | Johnson |
| 9,574,551 B2 | 2/2017 | Parrella et al. |
| 9,765,605 B2 | 9/2017 | Williamson et al. |
| 10,203,162 B2 | 2/2019 | Yokomine et al. |
| 11,131,484 B2 | 9/2021 | Mcbay |
| 11,841,172 B2 | 12/2023 | Lindberg et al. |
| 11,852,383 B2 | 12/2023 | Lindberg et al. |
| 11,897,828 B1 | 2/2024 | Lindberg et al. |
| 11,905,797 B2 | 2/2024 | Lindberg et al. |
| 11,905,814 B1 | 2/2024 | Smith et al. |
| 11,913,679 B1* | 2/2024 | Lindberg .................. F03G 7/04 |
| 2003/0145592 A1 | 8/2003 | Stratford |
| 2004/0084182 A1 | 5/2004 | Edgar et al. |
| 2004/0131488 A1 | 7/2004 | Locher |
| 2006/0180537 A1 | 8/2006 | Loftis et al. |
| 2007/0151244 A1 | 7/2007 | Gurin |
| 2009/0226308 A1 | 9/2009 | Vandor |
| 2009/0227185 A1 | 9/2009 | Summers et al. |
| 2011/0167819 A1 | 7/2011 | Lakic |
| 2011/0232858 A1* | 9/2011 | Hara ...................... F24T 10/17 165/45 |
| 2012/0144829 A1 | 6/2012 | Wiggs et al. |
| 2012/0175077 A1 | 7/2012 | Lehmann et al. |
| 2013/0232973 A1 | 9/2013 | McBay |
| 2013/0234444 A1 | 9/2013 | Rogers et al. |
| 2013/0333383 A1 | 12/2013 | Schwarck |
| 2014/0047836 A1 | 2/2014 | Parrella |
| 2014/0262137 A1 | 9/2014 | McBay |
| 2014/0309936 A1 | 10/2014 | Abbassian et al. |
| 2015/0027721 A1 | 1/2015 | Shreider et al. |
| 2015/0300327 A1 | 10/2015 | Sweatman et al. |
| 2016/0123116 A1 | 5/2016 | Randle et al. |
| 2016/0251953 A1 | 9/2016 | Samuel et al. |
| 2016/0363350 A1 | 12/2016 | Tahara |
| 2017/0260829 A1 | 9/2017 | Aadnøy |
| 2017/0268803 A1 | 9/2017 | Cauchy |
| 2018/0016872 A1 | 1/2018 | Randle |
| 2018/0106138 A1 | 4/2018 | Randolph |
| 2018/0224164 A1 | 8/2018 | Lakic |
| 2019/0032446 A1 | 1/2019 | Gronning |
| 2019/0055930 A1 | 2/2019 | Muir et al. |
| 2019/0178391 A1 | 6/2019 | Gottlieb et al. |
| 2020/0011151 A1 | 1/2020 | Toews et al. |
| 2020/0040267 A1 | 2/2020 | Willigenburg et al. |
| 2020/0072199 A1 | 3/2020 | Fontana et al. |
| 2020/0353518 A1 | 11/2020 | Chandran et al. |
| 2021/0025241 A1 | 1/2021 | Crichlow |
| 2021/0025623 A1 | 1/2021 | Holtzman |
| 2021/0122656 A1 | 4/2021 | Willberg et al. |
| 2021/0262317 A1 | 8/2021 | Gravois |
| 2021/0270496 A1 | 9/2021 | Holtzman |
| 2021/0348489 A1 | 11/2021 | O'Malley et al. |
| 2022/0049592 A1 | 2/2022 | McBay |
| 2022/0154978 A1 | 5/2022 | McBay |
| 2023/0130169 A1 | 4/2023 | McIntyre |
| 2023/0272947 A1* | 8/2023 | Lindberg .............. E21B 36/003 60/641.2 |
| 2023/0296086 A1 | 9/2023 | Lindberg et al. |
| 2023/0304705 A1* | 9/2023 | Lindberg ................ F24T 10/17 |
| 2023/0349265 A1* | 11/2023 | Lindberg ................ F03G 4/029 |
| 2024/0271829 A1 | 8/2024 | Lindberg et al. |
| 2024/0271832 A1 | 8/2024 | Lindberg et al. |
| 2024/0295346 A1 | 9/2024 | Lindberg et al. |

FOREIGN PATENT DOCUMENTS

| | | |
|---|---|---|
| CN | 113494273 A | 10/2021 |
| CN | 216741858 U | 6/2022 |
| EP | 0236640 A1 | 9/1987 |
| EP | 0326736 A2 | 8/1989 |
| GB | 2615913 A | 8/2023 |
| JP | 107286760 A | 10/1995 |
| JP | H10510892 A | 10/1998 |
| JP | 2011052621 A | 3/2011 |
| JP | 2014202149 A | 10/2014 |
| JP | 2018200027 A | 12/2018 |
| JP | 2020067027 A | 4/2020 |
| WO | 2009116873 A1 | 9/2009 |
| WO | 2012079078 A2 | 6/2012 |
| WO | 2013025640 A2 | 2/2013 |
| WO | 2016204287 A1 | 12/2016 |
| WO | 2022123626 A1 | 6/2022 |

OTHER PUBLICATIONS

Boehm, R.F. et al., Modelling of a Magma Energy Geothermal Power Plant, presented at ASME Winter Annual Meeting, Boston MA, Dec. 1987, SAND-87-0564C, DE88 003793, 11 pages.

\* cited by examiner

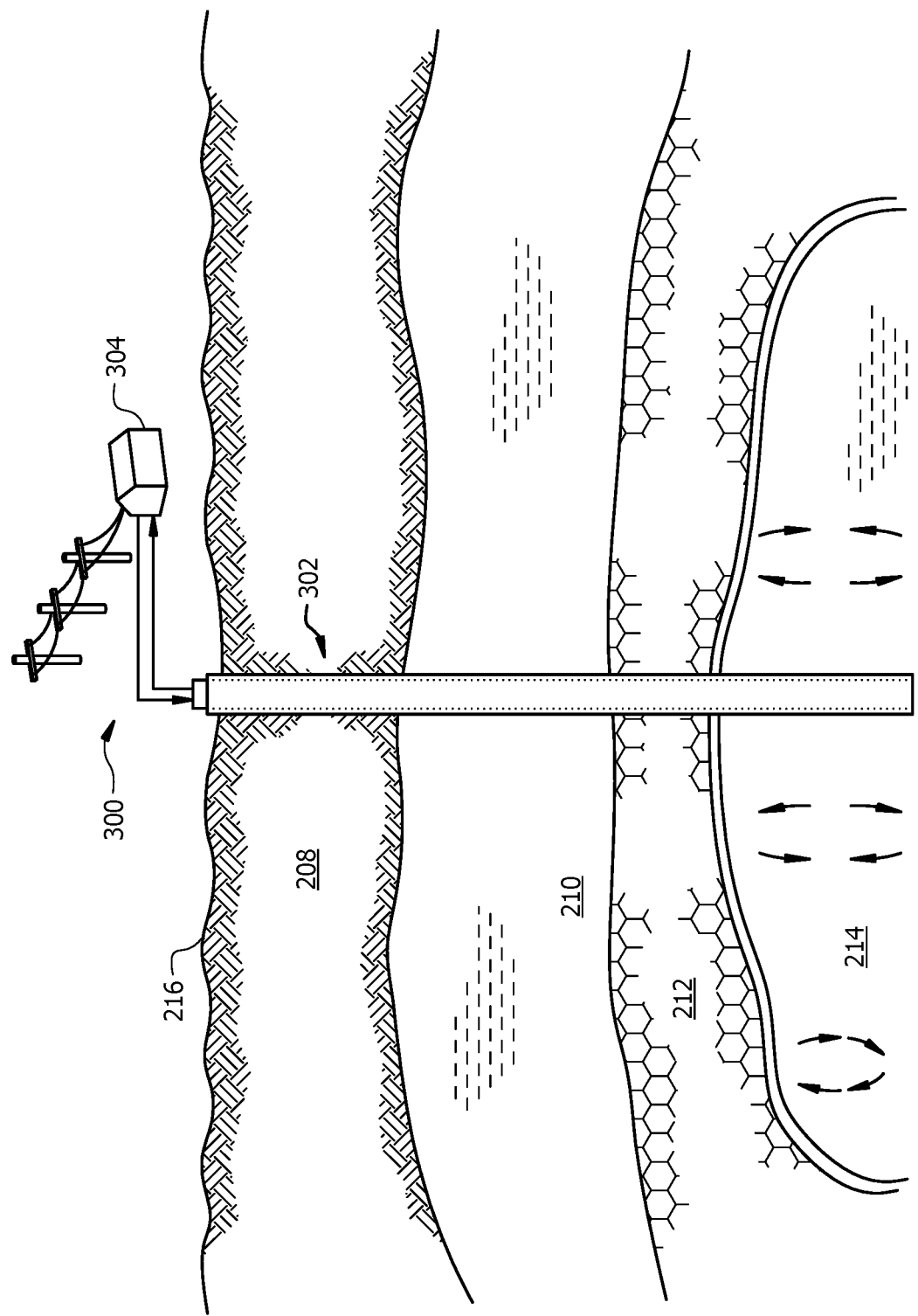

CASING A WELLBORE IN MAGMA

TECHNICAL FIELD

The present disclosure relates generally to geothermal systems and related methods and more particularly to casing a wellbore in magma.

BACKGROUND

Solar power and wind power are commonly available sources of renewable energy, but both can be unreliable and have relatively low power densities. In contrast, geothermal energy can potentially provide a higher power density and can operate in any weather condition or during any time of day. However, there exists a lack of tools for effectively harnessing geothermal energy.

SUMMARY

This disclosure recognizes the previously unidentified and unmet need for a well casing that can be safely, efficiently, and reliably placed in a wellbore that extends into a magma reservoir, such as a dyke, sill, or other magmatic formations. This disclosure provides a solution to this unmet need in the form of systems and processes for casing a wellbore that contains a drilling or cooling fluid by adjusting the buoyancy of a closed-end casing using another fluid. Once the casing is lowered to a desired depth using the approach described in this disclosure, the surface of the wellbore within the magma reservoir may be allowed to remelt, such that more direct heat transfer can occur between the magma reservoir and the casing. A heat transfer fluid is then provided down the reservoir, and the resulting heated fluid (e.g., steam) can be used to power a number of processes, such as for electricity production and the like.

Most previous geothermal systems tap into low temperature resources of less than 107° F. to 182° F. that are relatively near the surface, significantly limiting applications and locations where previous geothermal systems can be deployed. In addition to other disadvantages of previous geothermal technology, the inability of previous technology to efficiently and reliably access high-temperature underground geothermal resources renders conventional geothermal systems technologically and financially impractical for many applications.

In some embodiments, the geothermal system of this disclosure is a closed geothermal system that exchanges heat with an underground magma reservoir using a closed heat-transfer loop in which a heat transfer fluid can be pumped into the casing, heated via contact with the underground magma reservoir, and returned to the surface to facilitate one or more thermally driven processes. As an example, the underground magma reservoir may uniquely facilitate the generation of high-temperature, high-pressure steam (or another high temperature fluid), while avoiding problems and limitations associated with previous geothermal technology.

The geothermal system of this disclosure may harness a geothermal resource (e.g., magma reservoir) with a sufficient energy density from magmatic activity, such that the geothermal resource does not degrade significantly over time. This disclosure illustrates improved systems and methods for capturing energy from magma formations, including dykes, sills, and other magmatic formations, that are significantly higher in temperature than heat sources that are accessed using previous geothermal technologies and that can contain an order of magnitude higher energy density than the geothermal fluids that power previous geothermal technologies. In some cases, the present disclosure can significantly decrease costs and improve reliability of processes used to establish a casing in a geothermal well. In some cases, the present disclosure may facilitate more efficient electricity production and/or other processes in regions where access to reliable power is currently unavailable or transport of non-renewable fuels is challenging.

Certain embodiments may include none, some, or all of the above technical advantages. One or more technical advantages may be readily apparent to one skilled in the art from figures, description, and claims included herein.

BRIEF DESCRIPTION OF THE FIGURES

For a more complete understanding of the present disclosure, reference is now made to the following description, taken in conjunction with the accompanying drawings and detailed description, in which like reference numerals represent like parts.

FIG. 3 is a diagram of an example improved geothermal system of this disclosure.
FIG. 4A shows a configuration in which a borehole is prepared that extends into a magma reservoir.
FIG. 4B shows a configuration in which a casing is lowered into the borehole.
FIG. 4C shows a configuration in which the casing reaches a target depth and drilling fluid is removed from the borehole.
FIG. 4D shows a configuration in which a wellhead is attached to the casing, and the casing is used to obtain a heated fluid for driving downstream processes.

DETAILED DESCRIPTION

Embodiments of the present disclosure and its advantages will become apparent from the following detailed description when considered in conjunction with the accompanying figures. In the figures, each identical, or substantially similar component that is illustrated in various figures is represented by a single numeral or notation. For purposes of clarity, not every component is labeled in every figure, nor is every component of each embodiment shown where illustration is not necessary to allow those of ordinary skill in the art to understand the disclosure.

The present disclosure includes unexpected observations, which include the following: (1) magma reservoirs can be located at relatively shallow depths of less than 2.5 km; (2) the top layer of a magma reservoir may have relatively few crystals with little or no mush zone; (3) rock near or around magma reservoirs is generally not ductile and can support fractures; (4) a magma reservoir does not decline in thermal output over at least a two-year period; (5) eruptions at drill sites into magma reservoirs are unlikely (e.g., eruptions have not happened at African and Icelandic drill sites in over 10,000 years and it is believed a Kilauea, Hawaii drill site has never erupted); and (6) drilling into magma reservoirs can be reasonably safe.

As used herein, "magma" refers to extremely hot liquid and semi-liquid rock under the Earth's surface. Magma is formed from molten or semi-molten rock mixture found typically between 1 km to 10 km under the surface of the Earth. As used herein, "borehole" refers to a hole that is drilled to aid in the exploration and recovery of natural resources, including oil, gas, water, or heat from below the surface of the Earth. As used herein, a "wellbore" refers to a borehole either alone or in combination with one or more other components disposed within or in connection with the borehole in order to perform exploration and/or recovery processes. As used herein, "fluid conduit" refers to any structure, such as a pipe, tube, or the like, used to transport fluids. As used herein, "heat transfer fluid" refers to a fluid, e.g., a gas or liquid, that takes part in heat transfer by serving as an intermediary in cooling on one side of a process, transporting and storing thermal energy, and heating on another side of a process. Heat transfer fluids are used in processes requiring heating or cooling.

Figure 1:
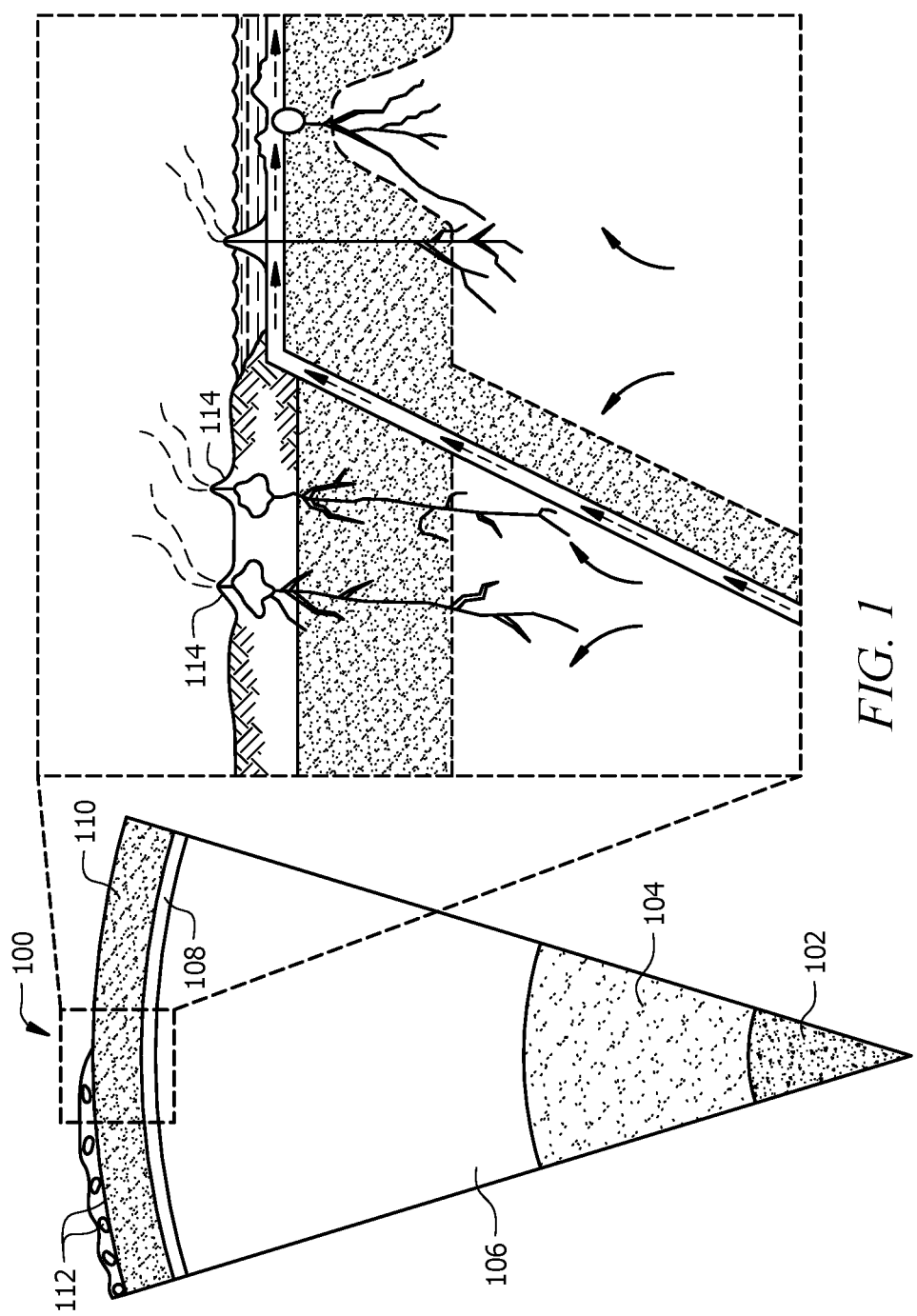
FIG. 1 is a diagram of underground regions in the Earth.

FIG. 1 is a partial cross-sectional diagram of the Earth depicting underground formations that can be tapped by geothermal systems of this disclosure (e.g., for generating geothermal power). The Earth is composed of an inner core 102, outer core 104, lower mantle 106, transition zone 108, upper mantle 110, and crust 112. There are places on the Earth where magma reaches the surface of the crust 112 forming volcanoes 114. However, in most cases, magma approaches only within a few miles or less from the surface. This magma can heat ground water to temperatures sufficient for certain geothermal power production. However, for other applications, such as geothermal energy production, more direct heat transfer with the magma is desirable.

Figure 2:
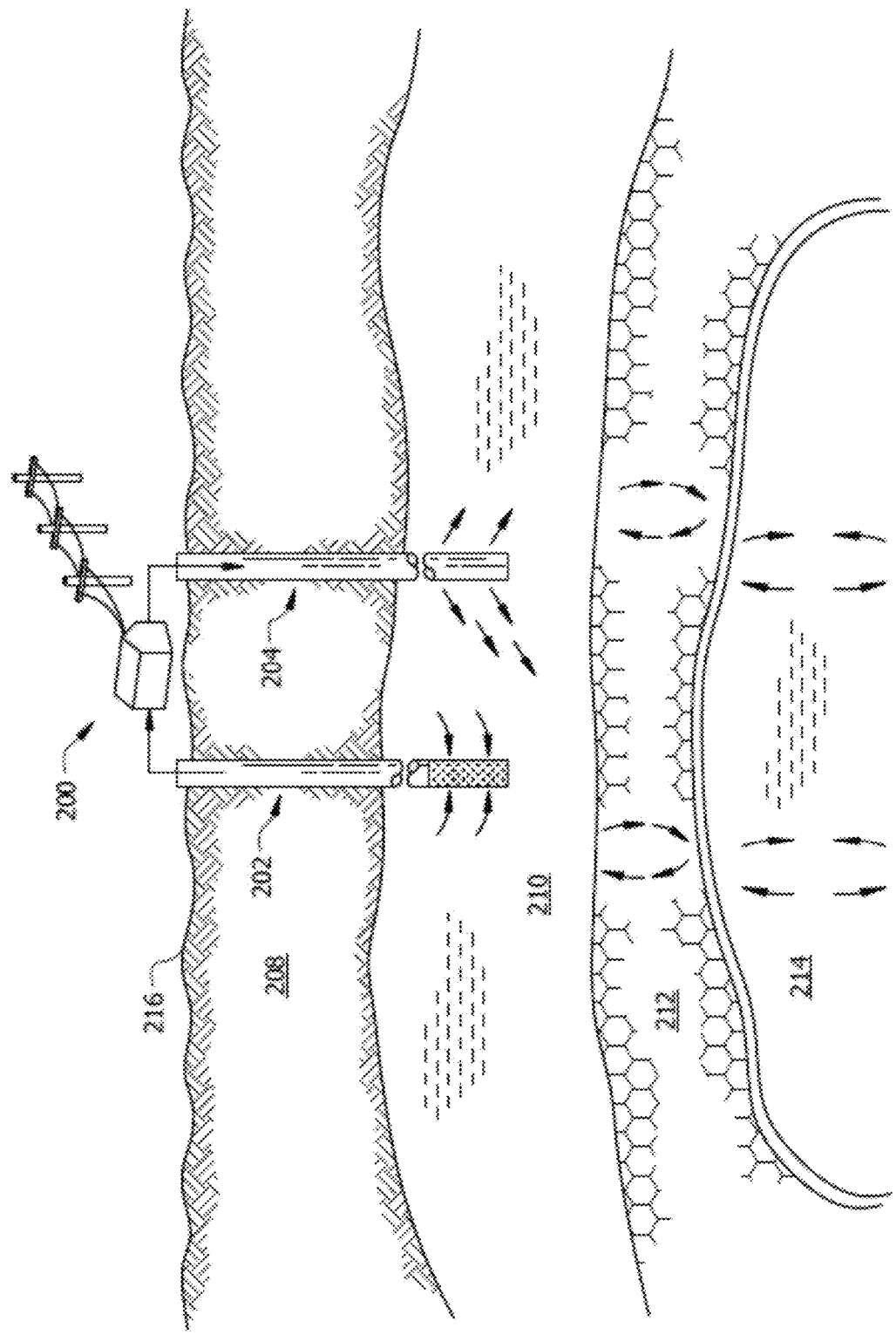
FIG. 2 is a diagram of a previous geothermal system.

FIG. 2 illustrates a conventional geothermal power generation system 200 that harnesses energy from heated ground water. The geothermal system 200 is a "flash-plant" that generates power from high-temperature, high-pressure geothermal water extracted from a production well 202. The production well 202 is drilled through rock layer 208 and into the geothermal fluid layer 210 that serves as the source of geothermal water. The geothermal water is heated indirectly via heat transfer with intermediate layer 212, which is in turn heated by magma reservoir 214. Magma reservoir 214 can be any underground region containing magma such as a dyke, sill, or the like. Convective heat transfer (illustrated by the arrows indicating that hotter fluids rise to the upper portions of their respective layers before cooling and sinking, then rising again) may facilitate heat transfer between these layers. Geothermal water from layer 210 flows to the surface 216 and is used for geothermal power generation. The geothermal water (and possibly additional water or other fluids) is then injected back into layer 210 via injection well 204.

The configuration of conventional geothermal system 200 of FIG. 2 suffers from drawbacks and disadvantages, as recognized by this disclosure. For example, because geothermal water is a polyphase fluid (i.e., not pure water), the geothermal water flashes at various points along its path up to the surface 216, creating water hammer, which results in a large amount of noise and potential damage to system components. The geothermal water is also prone to causing scaling and corrosion of system components. Chemicals may be added to partially mitigate these issues, but this may result in considerable increases in operational costs and increased environmental impacts, since these chemicals are generally introduced into the environment via injection well 204.

Example Improved Geothermal System

FIG. 3 illustrates an example magma-based geothermal system 300 of this disclosure. The geothermal system 300 includes a wellbore 302 that extends from the surface 216 at least partially into the magma reservoir 214. The geothermal system 300 is a closed system in which a heat transfer fluid is provided down the wellbore 302 to be heated and returned to a thermal or heat-driven process system 304 (e.g., for power generation and/or any other thermal processes of interest). As such, geothermal water is not extracted from the Earth, resulting in significantly reduced risks associated with the conventional geothermal system 200 of FIG. 2, as described further below. Heated heat transfer fluid is provided to the thermal process system 304. The thermal process system 304 is generally any system that uses the heat transfer fluid to drive a process of interest. For example, the thermal process system 304 may include an electricity generation system and/or support thermal processes requiring higher temperatures/pressures than could be reliably or efficiently obtained using previous geothermal technology, such as the system 200 of FIG. 2. Further details of components of an example thermal process system 304 are provided with respect to FIG. 6 below.

The geothermal system 300 provides technical advantages over previous geothermal systems, such as the conventional geothermal system 200 of FIG. 2. The geothermal system 300 can achieve higher temperatures and pressures for increased energy generation (and/or for more effectively driving other thermal processes). For example, because of the high energy density of magma in magma reservoir 214 (e.g., compared to that of geothermal water of layer 210), a single wellbore 302 can generally create the power of many wells of the conventional geothermal system 200 of FIG. 2. Furthermore, the geothermal system 300 has little or no risk of thermal shock-induced earthquakes, which might be attributed to the injection of cooler water into a hot geothermal zone, as is performed using the previous geothermal system 200 of FIG. 2. Furthermore, the heat transfer fluid is generally not substantially released into the geothermal zone by geothermal system 300, resulting in a decreased environmental impact and decreased use of costly materials (e.g., chemical additives that are used and introduced to the environment in great quantities during some conventional geothermal operations).

The geothermal system 300 may also have a simplified design and operation compared to those of previous systems. For instance, fewer components and reduced complexity may be needed at the thermal process system 304 because only clean heat transfer fluid (e.g., steam) reaches the surface 216. There may be no need or a reduced need to separate out solids or other impurities that are common to geothermal water. The example geothermal system 300 may include further components not illustrated in FIG. 3. Further details and examples of different configurations of geothermal systems and methods of their preparation and operation are described in U.S. patent application Ser. No. 18/099,499, filed Jan. 20, 2023, and titled "Geothermal Power from Superhot Geothermal Fluid and Magma Reservoirs"; U.S. patent application Ser. No. 18/099,509, filed Jan. 20, 2023, and titled "Geothermal Power from Superhot Geothermal Fluid and Magma Reservoirs"; U.S. patent application Ser. No. 18/099,514, filed Jan. 20, 2023, and titled "Geothermal Power from Superhot Geothermal Fluid and Magma Reservoirs"; U.S. patent application Ser. No. 18/099,518, filed Jan. 20, 2023, and titled "Geothermal Power from Superhot Geothermal Fluid and Magma Reservoirs"; U.S. patent application Ser. No. 18/105,674, filed Feb. 3, 2023, and titled "Wellbore for Extracting Heat from Magma Chambers"; U.S. patent application Ser. No. 18/116,693, filed Mar. 2, 2023, and titled "Geothermal systems and methods with an underground magma chamber"; U.S. patent application Ser. No. 18/116,697, filed Mar. 2, 2023, and titled "Method and system for preparing a geothermal system with a magma chamber"; and U.S. Provisional Patent Application No. 63/444,703, filed Feb. 10, 2023, and titled "Geothermal systems and methods using energy from underground magma reservoirs", the entirety of each of which is hereby incorporated by reference.

Example Cased Wellbore and its Preparation

FIGS. 4A-4D illustrate an example approach to preparing a wellbore, such as wellbore 302 of FIG. 3, with a casing 422 that extends into the underground magma reservoir 214. The approach illustrated in FIGS. 4A-4D facilitates the reliable and efficient placement of a casing in a borehole 402. This approach may solve newly recognized technical problems that are not encountered in conventional geothermal systems. For example, in order to maintain a stable borehole 402 that extends into magma reservoir 214, an appropriate cooling or drilling fluid 404 (referred to as "cooling/drilling fluid") may need to be supplied to the borehole 402 (see FIG. 4A) in order to prevent melting of a rock layer 410 in contact with the magma of magma reservoir 214. The resulting volume of cooling/drilling fluid 404 may complicate the process of lowering and positioning a casing 422 in the borehole 402 because the casing 422 needs to displace the cooling/drilling fluid 404 inside the borehole 402 in order to reach a target depth 442 (see FIG. 4C). In the new approach of this disclosure, a fluid 426 is supplied to the casing 422 to adjust the buoyancy of the casing 422 and aid in lowering the casing 422 to the target depth 442.

Figure 4A:
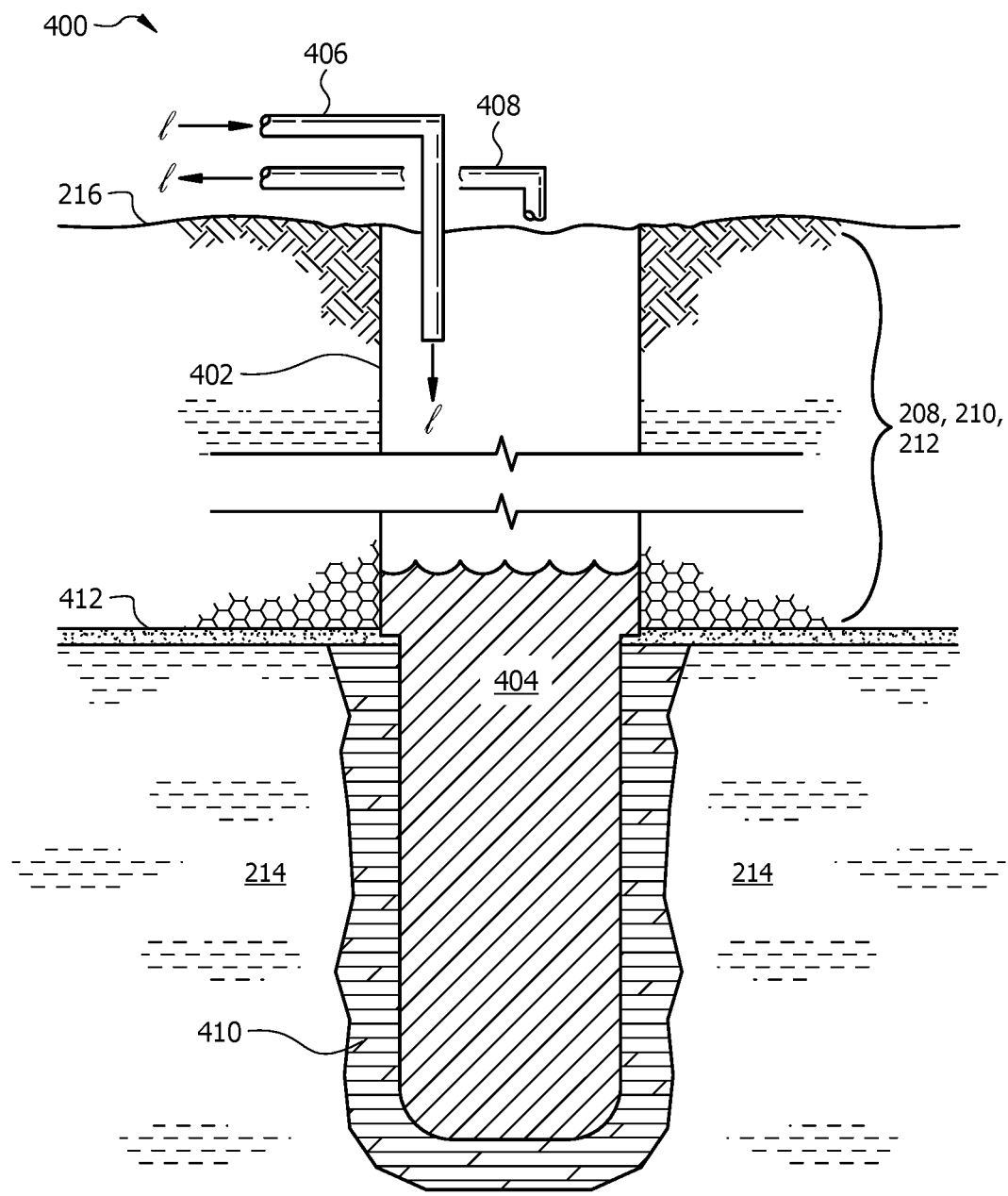
FIGS. 4A-4D are diagrams of geothermal wells of the system of FIG. 3 during various stages of the well preparation process.

FIG. 4A shows an initial configuration 400 after a borehole 402 is drilled from a surface 216 into a magma reservoir 214. Example systems and methods for preparing such a borehole 402 are described in U.S. patent application Ser. No. 18/099,499, filed Jan. 20, 2023, and titled "Geothermal Power from Superhot Geothermal Fluid and Magma Reservoirs"; U.S. patent application Ser. No. 18/099,509, filed Jan. 20, 2023, and titled "Geothermal Power from Superhot Geothermal Fluid and Magma Reservoirs"; U.S. patent application Ser. No. 18/099,514, filed Jan. 20, 2023, and titled "Geothermal Power from Superhot Geothermal Fluid and Magma Reservoirs"; U.S. patent application Ser. No. 18/099,518, filed Jan. 20, 2023, and titled "Geothermal Power from Superhot Geothermal Fluid and Magma Reservoirs"; U.S. patent application Ser. No. 18/105,674, filed Feb. 3, 2023, and titled "Wellbore for Extracting Heat from Magma Chambers"; U.S. patent application Ser. No. 18/116,693, filed Mar. 2, 2023, and titled "Geothermal systems and methods with an underground magma chamber"; U.S. patent application Ser. No. 18/116,697, filed Mar. 2, 2023, and titled "Method and system for preparing a geothermal system with a magma chamber"; and U.S. Provisional Patent Application No. 63/444,703, filed Feb. 10, 2023, and titled "Geothermal systems and methods using energy from underground magma reservoirs", which are already incorporated herein by reference. As an example, the borehole 402 may be prepared by drilling the borehole 402 from the surface 216 and towards the magma reservoir 214. The cooling/drilling fluid 404 is supplied into the borehole 402. The cooling/drilling fluid 404 may lift cuttings out of the borehole 402. The cooling/drilling fluid 404 also quenches magma in the magma reservoir 214 to form a solid rock layer 410 that can be cut by the drill bit. The rock layer 410 is drilled through until a desired depth is reached. One or more cement layers may be disposed on the internal walls of the borehole 402 above the magma reservoir 214 (i.e., above the ceiling 412 of the magma reservoir 214) to reinforce the structure of the borehole 402.

After the borehole 402 is prepared, a volume of the cooling/drilling fluid 404 continues to be provided to the borehole 402, such that the cooling/drilling fluid 404 at least fills from the bottom of the borehole 402 to the ceiling 412 of the magma reservoir 214. The cooling/drilling fluid 404 may be regularly supplied (e.g., continuously or intermittently) to the borehole 402 at an appropriate flow rate ($I$ of FIG. 4A) to prevent the rock layer 410 from melting. For example, an inlet conduit 406 may facilitate the flow of cooling/drilling fluid 404 into the borehole 402, while an outlet conduit 408 may facilitate flow of cooling/drilling fluid from the borehole 402. In some cases, the outlet conduit 408 may not be present or may not be used. Instead, cooling/drilling fluid 404 may exit the borehole 402 via evaporation. In some cases, the cooling/drilling fluid 404 is water. However, more generally, the cooling/drilling fluid 404 may be any appropriate fluid for absorbing heat within the borehole 402. For example, the cooling/drilling fluid 404 may include water, a brine solution, or the like.

Figure 4B:
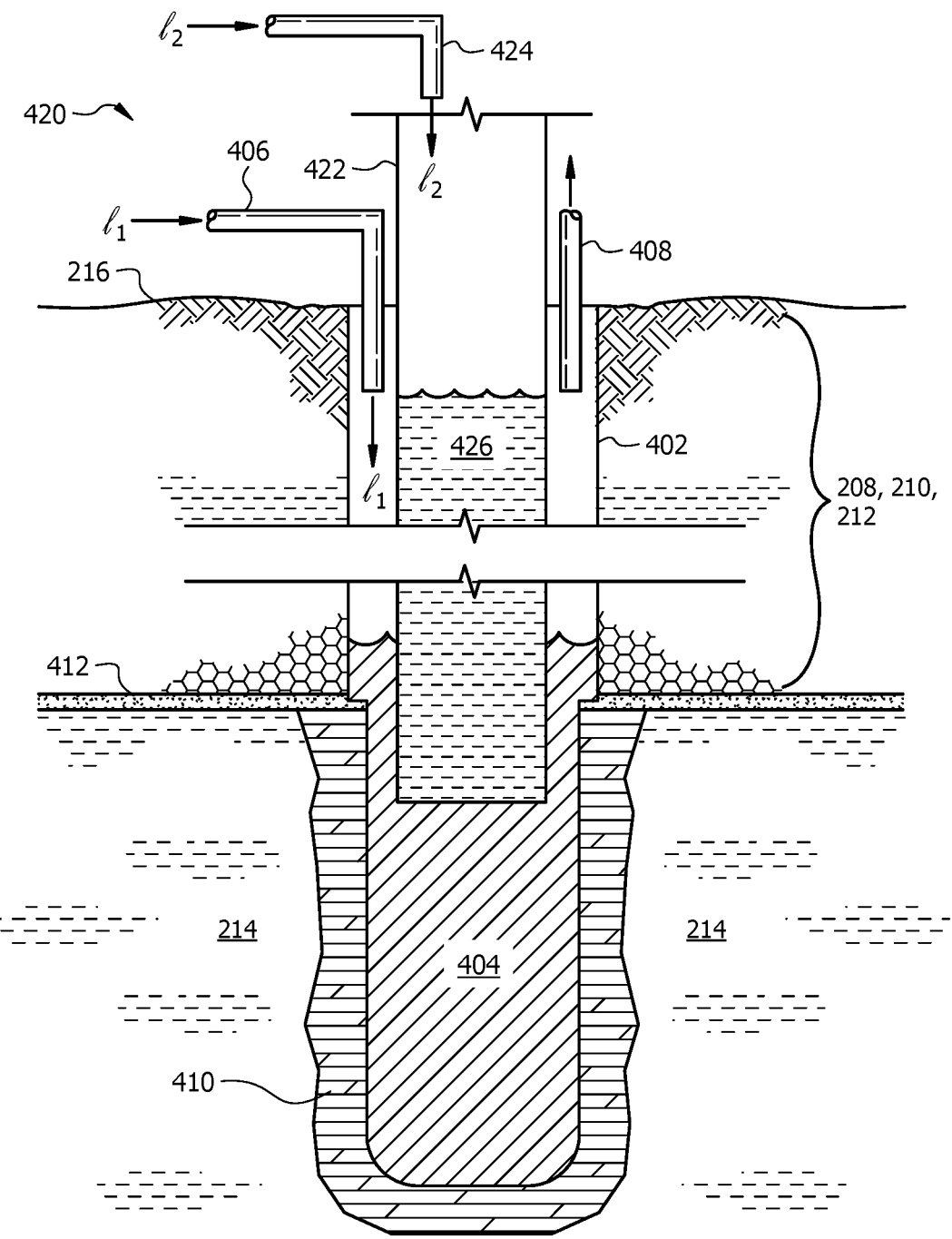

FIG. 4B shows a configuration 420 in which a casing 422 is being lowered into the borehole 402 containing cooling/drilling fluid 404. The casing 422 may be hung in sections or through any other process. The casing is generally lowered in a downward direction into the borehole 402. A downward direction refers to a direction moving into the Earth from the surface 216. The casing 422 may be any appropriate material for preventing or limiting transport of fluid from within the casing 422 into the adjacent layers 208, 210, 212, 214 of the Earth. For example, the casing 422 may have a cylindrical body formed of an alloy, cement, or other appropriate material. All or a portion of the casing 422 may be insulated (see, e.g., insulation layer 444 of FIG. 4C). The casing 422 is closed at its terminal end 428$a$ (see FIG. 4C) and open at its opposite end (see top opening 428$b$ of FIG. 4C). The closed terminal end 428$a$ may be an endcap of the casing 422.

At some point during the lowering of the casing 422, the casing 422 may no longer move downwards. For example, an upward force or buoyancy of the cooling/drilling fluid 404 may counteract or balance with the downward force resulting from the mass of the casing 422, causing the casing 422 to stop moving downwards. In response to observing this situation and/or to prevent this situation, a fluid 426 may be added into the casing 422 through conduit 424. The fluid 426 may be any appropriate fluid, such as water, a brine solution, or the like. In some cases, the fluid 426 is the same as the heat transfer fluid 466 that is later used during operation of the casing 422.

In some cases, fluid 426 is added to the casing 422 at a flow rate ($I_2$ of FIG. 4B) to achieve a target volume in the casing 422. In some cases, fluid 426 is added when the casing 422 stops moving downwards or moves at less than a threshold speed. For example, in response to observing that the casing 422 is no longer moving downwards or is moving downwards at less than the threshold speed, fluid 426 may be added to the casing 422. Fluid 426 may be added until a target speed is reached for the downward movement of the casing 422 into the borehole 402.

Figure 4C:
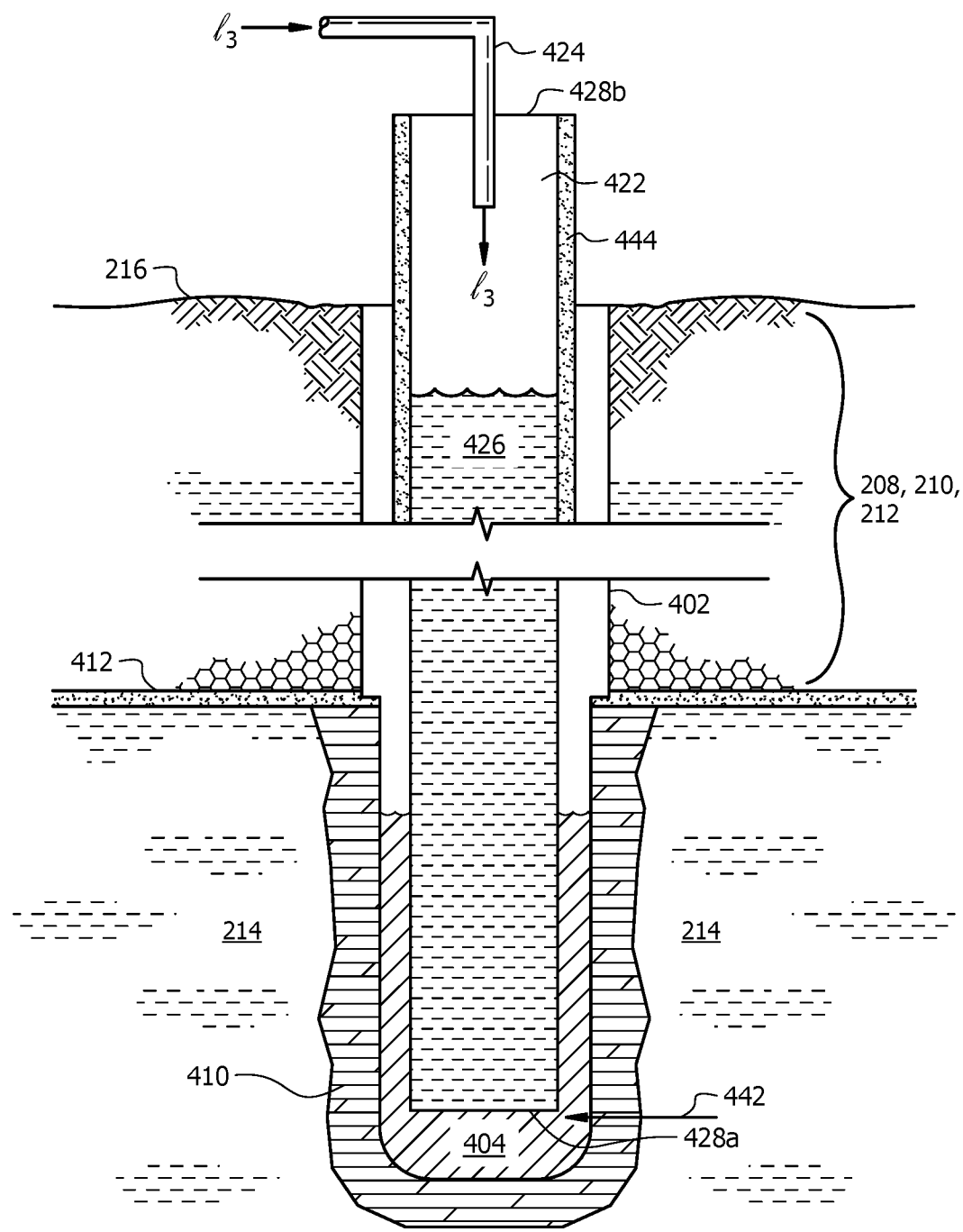

FIG. 4C shows a configuration 440 in which the casing 422 has reached a target depth 442 in the borehole 402. The target depth 442 may be selected to achieve a desired temperature within the casing 422. After the target depth 442 is reached, cooling/drilling fluid 404 is no longer provided to the borehole 402. The cooling/drilling fluid 404 is allowed to be removed from the borehole 402 (e.g., via evaporation) or may be actively removed from the borehole 402 (e.g., by pumping out the cooling/drilling fluid 404). When the cooling/drilling fluid 404 is removed (or the amount of cooling/drilling fluid 404 is reduced), the rock layer 410 can increase in temperature and remelt. Fluid 426 may still be provided to the casing 422 if desired (e.g., to keep the casing at a desired temperature). The fluid 426 may be provided at any desired flow rate ($I_3$ of FIG. 4C).

Figure 4D:
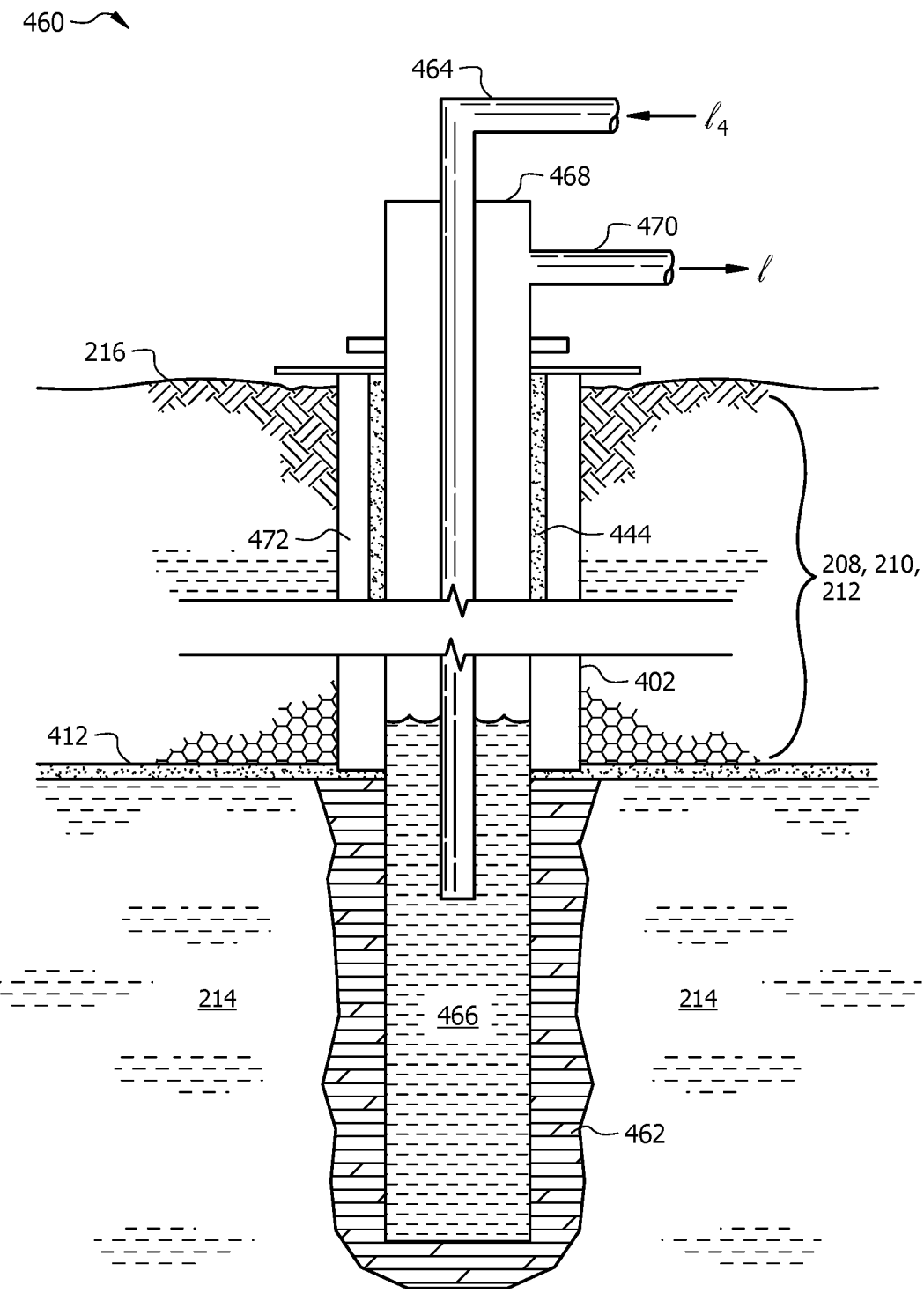

FIG. 4D shows a configuration 460 after the rock layer 410 has melted and a new rock layer 462 is formed in contact with and/or proximate to the outer wall of the casing 422. In this way, heat transfer between magma in the magma reservoir 214 and heat transfer fluid 466 in the casing 422 is improved. The configuration 460 may correspond to a completed wellbore 302 of FIG. 3. An inlet conduit 464 facilitates the introduction of heat transfer fluid 466 into the casing 422. The heat transfer fluid 466 may be provided at a controlled flow rate ($I_4$ in FIG. 4D). The flow rate may be selected to maintain the volume of heat transfer fluid 466 at a desired level or within a desired range of levels within the casing 422 (e.g., at or above the ceiling 412 of the magma reservoir 214). The flow rate may be selected to maintain the pressure within the casing 422 within a desired range. The flow rate may be selected to achieve desired properties of heated heat transfer fluid 466 exiting the casing 422 via conduit 470.

A wellhead 468 is attached to the casing 422. The wellhead 468 includes fluid connections, valves, and the like for facilitating appropriate operation of the casing 422 as a geothermal wellbore (e.g., as the completed wellbore 302 of FIG. 3). For example, the wellhead 468 may include one or more valves to allow or restrict flow from the casing 422 towards a heat-driven process system via conduit 470. The wellhead 468 may include a relief valve for venting heat transfer fluid 466 if an excessive pressure is reached. The outlet conduit 470 of the wellhead 468 allows flow of heated heat transfer fluid 466 (e.g., steam) from the casing 422. The outlet conduit 470 may be coupled to a heat-driven process system (e.g., heat-driven process system 304 of FIG. 3 or 6). An insulation layer 444 on the outer surface of the casing 422 may reduce heat transfer with the cooler environment nearer the surface 216. A gap 472 between the casing 422 and rock nearer surface 216 may provide additional insulation in the top section of the borehole 402.

The heat transfer fluid 466 may be any appropriate fluid for absorbing heat within the casing 422 and driving a downstream thermal process (e.g., electricity generation). For example, the heat transfer fluid 466 may include water, a brine solution, one or more refrigerants, a thermal oil (e.g., a natural or synthetic oil), a silicon-based fluid, a molten salt, a molten metal, or a nanofluid (e.g., a carrier fluid containing nanoparticles). A molten salt is a salt that is a liquid at the high operating temperatures experienced in the wellbore 302 (e.g., at temperatures between 1,600 and 2,300° F.). In some cases, an ionic liquid may be used as the heat transfer fluid 466. An ionic liquid is a salt that remains a liquid at more modest temperatures (e.g., at or near room temperature). In some cases, a nanofluid may be used as the heat transfer fluid 466. The nanofluid may be a molten salt or ionic liquid with nanoparticles, such as graphene nanoparticles, dispersed in the fluid 466. Nanoparticles have at least one dimension of 100 nanometers (nm) or less. The nanoparticles increase the thermal conductivity of the molten salt or ionic liquid carrier fluid. This disclosure recognizes that molten salts, ionic liquids, and nanofluids can provide improved performance as heat transfer fluids 466 in the casing 422. For example, molten salts and/or ionic liquids may be stable at the high temperatures that can be reached in the casing 422. The high temperatures that can be achieved by these materials not only facilitate increased energy extraction but also can drive thermal processes that were previously inaccessible using previous geothermal technology. The heat transfer fluid 466 may be selected at least in part to limit the extent of corrosion of surfaces, for example, within the casing 422 and/or in connected systems. As an example, when the heat transfer fluid 466 is used to drive electricity-generating turbines (see FIG. 6), the heat transfer fluid 466 may be water. The water is supplied in the liquid phase via conduit 464 and is transformed into steam within the casing 422. The steam can be used to drive turbines for electricity generation.

Example Method of Preparing a Cased Wellbore

Figure 5:
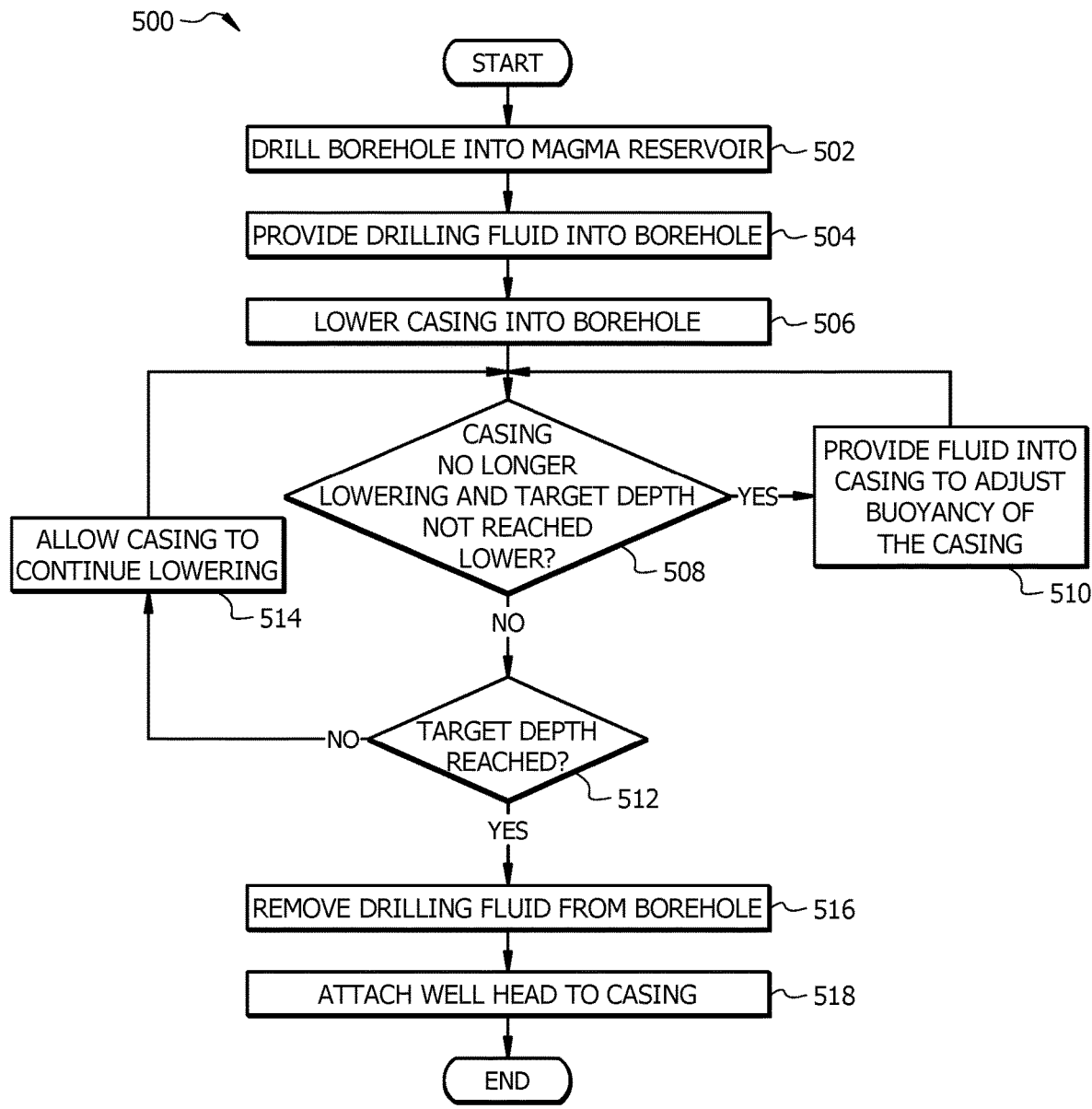
FIG. 5 is a flowchart of an example method for preparing and operating the geothermal system and cased borehole as shown in FIGS. 3 and 4A-4D.

FIG. 5 illustrates an example method 500 of preparing a wellbore (e.g., a wellbore 302 of FIG. 3) according to the approach illustrated in FIGS. 4A-4D. The method 500 may begin at step 502 where a borehole 402 is drilled into a magma reservoir 214. As an example, the borehole 402 may be drilled until magma is reached in the magma reservoir 214. Once the magma reservoir 214 is reached (or nearly reached) cooling/drilling fluid 404 is provided down the borehole 402. The cooling/drilling fluid 404 quenches magma in the magma reservoir 214, thereby allowing this hardened material to be drilled into to form the borehole 402 illustrated, for example, in FIG. 4A. For example, the quenched magma may harden to form a rock plug that can be drilled into using an appropriate drill bit. In some cases, cooling/drilling fluid 404 may be provided down the borehole 402 during previous phases of the drilling process (e.g., before the magma reservoir 214 is reached).

At step 504, drilling fluid is provided into the borehole 402. For example, the cooling/drilling fluid 404 may continue to be flowed through the borehole 402 (e.g., via conduit 406 and 408 as described above with respect to FIG. 4A). The cooling/drilling fluid 404 may be provided at a flow rate sufficient to maintain the volume of the cooling/drilling fluid 404 at or above the ceiling 412 of the magma reservoir 214. This step may aid in maintaining the stability of the borehole 402, for example, by preventing remelting of rock layer 410 and/or providing a fluid pressure to help prevent or limit an inward collapse of the inner borehole wall formed of rock layer 410.

At step 506, the casing 422 is lowered into the borehole 402. For example, the casing 422 may be hung in sections or through any other process and allowed to move downward into the borehole 402. FIG. 4B illustrates a point in time during step 506 when the casing 422 is partially lowered into the borehole 402.

At step 508, a determination may be made of whether the casing 422 is no longer lowering into the borehole 402 (e.g., whether the casing 422 is not moving downwards at greater than a threshold speed) and/or the target depth 442 has not been reached. If both criteria are satisfied, then the fluid 426 is provided into the casing 422 at step 510. For example, fluid 426 may be added to the casing 422 through conduit 424. Fluid 426 may be added until a target speed is reached for the downward movement of the casing 422 into the borehole 402. In some cases, a predefined volume of fluid 426 may be provided into the casing 422. For example, a volume may be determined to counteract the buoyancy of the cooling/drilling fluid 404, and this volume of fluid 426 may be provided to the casing 422. In some cases, the fluid 426 may be provided at a predefined flow rate (see, e.g., $I_3$ of FIG. 4C) to counteract buoyancy of the cooling/drilling fluid 404 in the borehole 402.

If the criteria at step 508 are not satisfied, a determination is made of whether the terminal end 428a of the casing 422 has reached a target depth 442. For example, a length of the casing 422 known to have been lowered into the borehole may be compared to the target depth 442. If the values are within a predefined threshold of each other, then the target depth 442 may have been reached at step 512. If the target depth 442 has not been reached, the casing is allowed to continue lowering at step 514. Otherwise, if the target depth 442 has been reached, the method 500 proceeds to step 516.

At step 516, the drilling/cooling fluid 404 is removed from the borehole 402. For example, flow of cooling/drilling fluid 404 into the borehole 402 may be stopped. In this example, the cooling/drilling fluid 404 may be allowed to evaporate or vaporize. Stopping the flow of the cooling/drilling fluid 426 into the borehole 402 may cause the rock layer 410 to melt and magma within the magma reservoir 214 to contact an outer surface of the casing 422. The fluid 426 (or another fluid 466) in the casing 422 may then provide sufficient cooling for a new rock layer 462 to form proximate to and/or in contact with the casing 422 (See FIG. 4D). For example, the fluid 426 or a heat transfer fluid 466 may be flowed through the casing 422, thereby causing the new rock layer 462 to form proximate the outer surface of the casing 422 (see FIG. 4D)

At step 518, a wellhead 468 is attached to the casing 422. For example, the top opening 428b of the casing 422 may be connected to the wellhead 468, which may in turn be in fluid communication with the heat-driven process system 304. Any appropriate fluid connections may be used to achieve this. The resulting geothermal system (see, e.g., geothermal system 300 of FIG. 3) can then be used to drive thermal processes, such as for electricity generation, thermochemical processing, and the like.

Modifications, omissions, or additions may be made to method 500 depicted in FIG. 5. Method 500 may include more, fewer, or other steps. For example, at least certain steps may be performed in parallel or in any suitable order. Any suitable drilling equipment or associated component(s) may perform or may be used to perform one or more steps of the method 500.

Example Thermal Processing System

Figure 6:
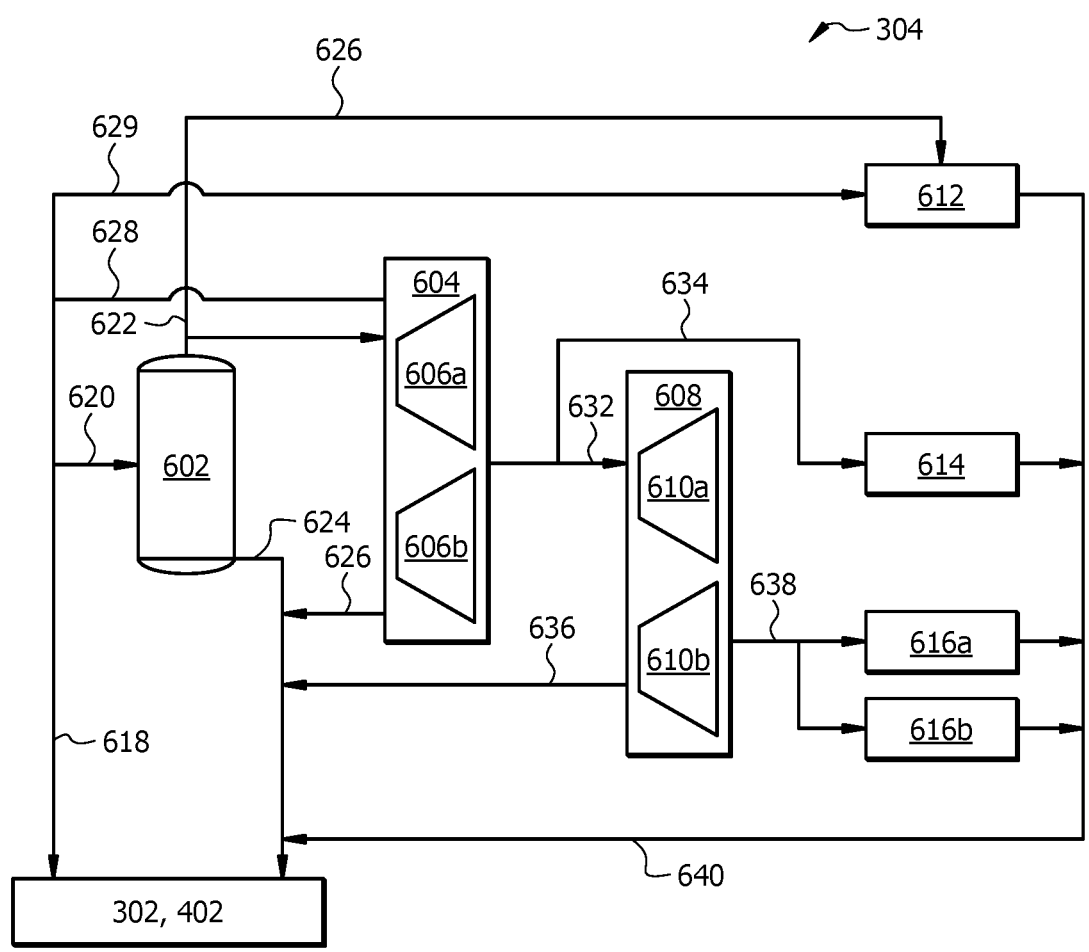
FIG. 6 is a diagram of an example system for performing thermal or heat-driven processes of FIG. 3.

FIG. 6 shows a schematic diagram of an example thermal process system 304 of FIG. 3. The thermal process system 304 includes a condenser 602, a first turbine set 604, a second turbine set 608, a high-temperature/pressure thermochemical process 612, a medium-temperature/pressure thermochemical process 614, and one or more lower temperature/pressure processes 616a, 616b. The thermal process system 304 may include more or fewer components than are shown in the example of FIG. 6. For example, a thermal process system 304 used for power generation alone may omit the high-temperature/pressure thermochemical process 612, medium-temperature/pressure thermochemical process 614, and lower temperature/pressure processes 616a, 616b. Similarly, a thermal process system 304 that is not used for power generation may omit the turbine sets 604, 608. As a further example, if heat transfer fluid is known to be received only in the gas phase, the condenser 602 may be omitted in some cases. The ability to tune the properties of the heat transfer fluid received from the unique wellbore 302 of FIG. 3 (i.e., as prepared according to the method 500 of FIG. 5 and/or the approach illustrated in FIGS. 4A-4D) facilitates improved and more flexible operation of the thermal process system 304. For example, the depth of the wellbore 302, the residence time of heat transfer fluid in the wellbore 302, the pressure achieved in the wellbore 302, and the like can be selected or adjusted to provide desired heat transfer fluid properties at the thermal process system 304.

In the example of FIG. 6, the thermal process system 304 receives a stream 618 from the wellbore 302. One or more valves (not shown for conciseness) may be used to control the allocation of stream 618 within the thermal process system 304, e.g., to a condenser 602 via stream 620, and/or to the first turbine set 604 via stream 628, and/or to the thermal process 612 via stream 629. Thus, the entirety of stream 618 can be provided to any one of streams 620, 628, or 629, or distributed equally or unequally among streams 620, 628, and 629.

The condenser 602 is connected to the wellbore 302 that extends between a surface and the underground magma reservoir 214. The condenser 602 separates a gas-phase heat transfer fluid (e.g., steam) from liquid-phase heat transfer fluid (e.g., condensate formed from the gas-phase heat transfer fluid). The condenser 602 may be a steam separator. A stream 620 received from the wellbore 302 may be provided to the condenser 602. A gas-phase stream 622 of heat transfer fluid from the condenser 602 may be sent to the first turbine set 604 and/or the thermal process 612 via stream 626. The thermal process 612 may be a thermochemical reaction requiring high temperatures and/or pressures (e.g., temperatures of between 500 and 2,000° F. and/or pressures of between 1,000 and 4,500 psig). A liquid-phase stream 624 of heat transfer fluid from the condenser 602 may be provided back to the wellbore 302.

The first turbine set 604 includes one or more turbines 606a, 606b. In the example of FIG. 6, the first turbine set includes two turbines 606a, 606b. However, the first turbine set 604 can include any appropriate number of turbines for a given need. The turbines 606a, 606b may be any known or yet to be developed turbine for electricity generation. The turbine set 604 is connected to the condenser 602 and is configured to generate electricity from the gas-phase heat transfer fluid (e.g., steam) received from the condenser 602 (stream 622). A stream 626 exits the set of turbines 604. The stream 626 may be provided back to the wellbore 302 (e.g., after being condensed).

If the heat transfer fluid is at a sufficiently high temperature, as may be uniquely and more efficiently possible using the wellbore 302, a stream 632 of gas-phase heat transfer fluid may exit the first turbine set 604. Stream 632 may be provided to a second turbine set 608 to generate additional electricity. The turbines 610a, 610b of the second turbine set 608 may be the same as or similar to turbines 606a, 606b, described above.

All or a portion of stream 632 may be sent as gas-phase stream 634 to a thermal process 614. Process 614 is generally a process requiring gas-phase heat transfer fluid at or near the conditions of the heat transfer fluid exiting the first turbine set 604. For example, the thermal process 614 may include one or more thermochemical processes requiring steam or another heat transfer fluid at or near the temperature and pressure of stream 632 (e.g., temperatures of between 250 and 1,500° F. and/or pressures of between 500 and 2,000 psig). The second turbine set 608 may be referred to as "low pressure turbines" because they operate at a lower pressure than the first turbine set 604. Condensate from the second turbine set 608 is provided back to the wellbore 302 via stream 636.

An effluent stream 638 from the second turbine set 608 may be provided to one or more thermal process 616a, 616b. Thermal processes 616a, 616b generally require less thermal energy than processes 612 and 614, described above (e.g., processes 616a, 616b may be performed temperatures of between 22° and 700° F. and/or pressures of between 15 and 120 psig). As an example, processes 616a, 616b may include water distillation processes, heat-driven chilling processes, space heating processes, agriculture processes, aquaculture processes, and/or the like. For instance, an example heat-driven chiller process 616a may be implemented using one or more heat driven chillers. Heat driven chillers can be implemented, for example, in data centers, crypto-currency mining facilities, or other locations in which undesirable amounts of heat are generated. Heat driven chillers, also conventionally referred to as absorption cooling systems, use heat to create chilled water. Heat driven chillers can be designed as direct-fired, indirect-fired, and heat-recovery units. When the effluent includes low pressure steam, indirect-fired units may be preferred. An effluent stream 640 from all processes 612, 614, 616a, 616b, may be provided back to the wellbore 302.

Although embodiments of the disclosure have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. Moreover, items shown or discussed as coupled or directly coupled or communicating with each other may be indirectly coupled or communicating through some interface device, or intermediate component whether electrically, mechanically, fluidically, or otherwise.

While this disclosure has been particularly shown and described with reference to preferred or example embodiments, it will be understood by those skilled in the art that various changes in form and detail may be made therein without departing from the spirit and scope of the disclosure. Accordingly, this disclosure includes all modifications and equivalents of the subject matter recited in the claims appended hereto as permitted by applicable law. Changes, substitutions and alterations are ascertainable by one skilled in the art and could be made without departing from the spirit and scope disclosed herein. Moreover, any combination of the above-described elements in all possible variations thereof is encompassed by the disclosure unless otherwise indicated herein or otherwise clearly contradicted by context.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

What is claimed is:

1. A process, comprising:
   preparing a borehole extending from a surface into an underground magma reservoir;
   providing a flow of a first fluid into the borehole, wherein providing the flow of the first fluid into the borehole causes a rock layer to be formed and maintained from magma around a portion of the borehole located within the magma reservoir;
   lowering a casing into the borehole;
   providing a second fluid into the casing, thereby causing the casing to sink into a volume of the first fluid within the borehole; and
   after the casing is sunk to a target depth within the borehole, ceasing the flow of the first fluid into the borehole thereby causing the rock layer maintained around the portion of the borehole located within the magma reservoir to remelt such that magma contacts casing located within the magma reservoir.

2. The process of claim 1, wherein the casing comprises a cylindrical body with an open end and a closed end.

3. The process of claim 1, further comprising continuously providing the flow of the first fluid into the borehole at least until the casing is lowered to the target depth.

4. The process of claim 1, further comprising, prior to providing the second fluid into the casing, determining that the casing is moving in a downward direction at less than a threshold speed.

5. The process of claim 4, further comprising, prior to providing the second fluid into the casing, determining that the target depth of the casing has not been reached.

6. The process of claim 1, further comprising providing the second fluid into the casing at a predetermined flow rate.

7. The process of claim 1, further comprising providing a predetermined volume of the second fluid into the casing, the predetermined volume sufficient to cause lowering of the casing to the target depth within the borehole.

8. The process of claim 1, wherein the first fluid is a drilling or cooling fluid.

9. The process of claim 1, further comprising providing the flow of that first fluid into the borehole at a flow rate sufficient to maintain a volume of the first fluid at or above a ceiling of the magma reservoir.

10. The process of claim 1, further comprising providing a flow of the second fluid or another fluid through the casing, thereby causing a new rock layer to form proximate the outer surface of the casing within the magma reservoir.

11. A process, comprising:
    preparing a borehole extending downward from a surface into a magma reservoir;
    providing a flow of a first fluid into the borehole to cause a rock layer to be formed and maintained from magma around a portion of the borehole located within the magma reservoir;
    lowering a casing into the borehole;
    providing a second fluid into the casing, thereby causing the casing to sink into a volume of the first fluid within the borehole and down to the portion of the borehole located within the magma reservoir; and;
    after the casing is in the portion of the borehole located within the magma reservoir, ceasing the flow of the first fluid into the borehole thereby causing the rock layer maintained around the portion of the borehole located within the magma reservoir to remelt such that magma contacts casing located within the magma reservoir.

12. The process of claim 11, wherein the casing comprises a cylindrical body with an open end and a closed end.

13. The process of claim 11, further comprising continuously providing the flow of the first fluid into the borehole at least until the casing is lowered to a target depth.

14. The process of claim 11, further comprising, prior to providing the second fluid into the casing, determining that the casing is moving in a downward direction at less than a threshold speed.

15. The process of claim 14, further comprising, prior to providing the second fluid into the casing, determining that a target depth of the casing has not been reached.

16. The process of claim 11, further comprising providing the second fluid into the casing at a predetermined flow rate.

17. The process of claim 11, further comprising providing a predetermined volume of the second fluid into the casing, the predetermined volume sufficient to cause lowering of the casing to a target depth within the borehole.

18. The process of claim 11, wherein the first fluid is a drilling or cooling fluid.

* * * * *